United States Patent
Shinada et al.

(10) Patent No.: US 6,980,098 B2
(45) Date of Patent: Dec. 27, 2005

(54) INFORMATION PROCESSING APPARATUS, INFORMATION PROCESSING METHOD AND PROGRAM EXECUTED IN INFORMATION PROCESSING APPARATUS

(75) Inventors: Akira Shinada, Tokyo (JP); Katsuhiko Nunokawa, Kanagawa (JP); Hiroaki Okajima, Chiba (JP); Makoto Sasaki, Chiba (JP)

(73) Assignee: Sony Corporation, Tokyo (JP)

( * ) Notice: Subject to any disclaimer, the term of this patent is extended or adjusted under 35 U.S.C. 154(b) by 346 days.

(21) Appl. No.: 10/059,854

(22) Filed: Jan. 29, 2002

(65) Prior Publication Data

US 2002/0109602 A1    Aug. 15, 2002

(30) Foreign Application Priority Data

Jan. 29, 2001  (JP) ............................ P2001-019346
Feb. 20, 2001  (JP) ............................ P2001-042785

(51) Int. Cl.$^7$ ............................................. B60Q 1/00
(52) U.S. Cl. ..................... 340/439; 340/576; 701/29; 705/400
(58) Field of Search ................................ 340/439, 575, 340/576, 573.1, 995.1, 460; 701/29, 213; 705/400, 402, 4

(56) References Cited

U.S. PATENT DOCUMENTS

| | | | | |
|---|---|---|---|---|
| 5,694,116 A | * | 12/1997 | Kojima | 340/576 |
| 5,797,134 A | * | 8/1998 | McMillan et al. | 705/400 |
| 5,813,989 A | * | 9/1998 | Saitoh et al. | 600/484 |
| 5,815,070 A | * | 9/1998 | Yoshikawa | 340/439 |
| 5,850,193 A | * | 12/1998 | Shimoura et al. | 340/995.1 |
| 6,046,671 A | * | 4/2000 | Shimoura et al. | 340/439 |
| 6,175,772 B1 | * | 1/2001 | Kamiya et al. | 700/31 |
| 6,278,362 B1 | * | 8/2001 | Yoshikawa et al. | 340/439 |

* cited by examiner

*Primary Examiner*—Phung T. Nguyen
(74) *Attorney, Agent, or Firm*—Jay H. Maioli (57) ABSTRACT

An information processing apparatus, an information processing method, and a program executed in the information processing apparatus. The invention is applied to the calculation of a premium and includes judging of driving of a driver on the basis of a detection result of an emotional state of the driver to enable a more objective judgment of the driving and the acquirement of a suitable judgment result. Another aspect relates to supplying the driver with various pieces of information obtained by a navigation system or the like. The driver is supplied with a prescribed piece of information while changing a transmission method according to an emotional state of the driver for enabling a suitable transmission of the various pieces of information to the driver.

7 Claims, 6 Drawing Sheets

INFORMATION PROCESSING APPARATUS, INFORMATION PROCESSING METHOD AND PROGRAM EXECUTED IN INFORMATION PROCESSING APPARATUS

CROSS REFERENCES TO RELATED APPLICATIONS

The present document is based on Japanese Priority Documents JP 2001-019346 and JP 2001-042785, filed in the Japanese Patent Office on Jan. 29, 2001 and Feb. 20, 2001, respectively, the entire contents of which being incorporated herein by reference.

BACKGROUND OF THE INVENTION

1. Field of the Invention

The present invention relates to an information processing apparatus, an information processing method and a program executed the information processing apparatus, and the invention can be utilized, for example, to calculate a premium. The present invention judges driving on the basis of a detection result of a driver's emotional state, and thereby the invention can judge the driving more objectively than conventional technique, and can obtain a suitable judgment result.

Another aspect of the present invention can be applied to a case where various pieces of information obtained by a navigation system or the like are supplied to a passenger and a driver of a vehicle. The present invention changes a transmission method of supplying the passenger and the driver with predetermined information according to passenger's, in particular, driver's emotional states, and thereby the aspect can suitably transmits the various pieces of information to the passenger.

2. Description of the Related Art

As for car driving, driver's driving skill has conventionally been judged on the basis of the length of the driver's driving experience, the driver's past accident history and the like, and the judgment is variously utilized as the need arises.

That is, for example, in an insurance system of cars, not only the amount of insurance to be paid to an accident is determined on the basis of such judgment of driving, but also the amount of a premium to be paid by a user, that is, an insured is determined on the basis of the judgment of driving.

Regarding the setting of such a premium, for example, a method disclosed in Published Japanese Translation of a PCT Application No. Hei 11-511581 observes user's safety driving to judge the user's driving skill for setting the premium of the user. It is considerable that the disclosed method can judge the user's driving more objectively than the conventional method based on the user's driving experience and the like.

However, differences among individuals exist in actual car operations. Some person is sufficiently calm and composed while the person drives at a high speed. Other person has no composure even when the person obeys a speed limit and drives a car safely. The former driver would be able to cope with a momentary accident quickly rather than the latter driver, and the former driver could previously prevent the accident. That is, in such a case, the former driver who is driving with sufficient composure can be judged to be at better driving although the driver drives at a high speed.

The conventional method of the judging on the basis of the driver's driving experience or the method of the judging on the observation of the safety driving cannot obtain such a judgment result based on the consideration of the driver's emotional condition. Consequently, the conventional methods have a problem of the difficulty of obtaining such a suitable judgment result.

A first aspect of the present invention was made on the consideration of the aforesaid matter. The aspect proposes an information processing apparatus, an information processing method and a program of the information processing apparatus, all being capable of judging driving more objectively to obtain a suitable judgment result than prior art.

Moreover, various devices for transmitting various pieces of information effectively to a passenger and, in particular, a driver of a car have conventionally been made.

That is, for example, when a driver or a passenger does not wear a seat belt, an alarm is sounded or a warning light is lighted for warning the driver. Moreover, warning lights warn a driver of a case of a door not being properly closed and a case of decrease of fuel by lighting. In addition, a predetermined alarm is sounded for calling for a driver's attention to backing.

However, a driver or a passenger sometimes regards the transmission of such various pieces of information as a nuisance. Inversely, in a case of being noisy in the interior of a vehicle, information cannot sometimes be grasped by means of such information transmission means.

A second aspect of the present invention was made on the consideration of the aforesaid matters. The present invention proposes an information processing apparatus, an information processing method and a program executed in the information processing apparatus, all being capable of transmitting various pieces of information to a driver and a passenger suitably.

SUMMARY OF THE INVENTION

The present invention, being applicable to an information processing apparatus, comprises information acquiring means for acquiring a state detection result of an emotion of a passenger and, in particular, a driver in a vehicle, and judging means for judging driving of the driver of the vehicle on the basis of the state detection result acquired by the information acquiring means.

Moreover, the invention, being applicable to an information processing method or a program executed in an information processing apparatus, comprising the steps of: acquiring a piece of information of a state detection result of an emotion of a passenger or, in particular, a driver in a vehicle, and judging driving of the driver of the vehicle on the basis of the state detection result acquired at the step of acquiring the information.

Moreover, the invention comprises state detecting means for detecting an emotional state of a passenger or, in particular, a driver, and controlling means for supplying the passenger and/or the driver with a predetermined piece of information while changing a transmission method according to a detection result detected by the state detecting means.

Moreover, the present invention, being applicable to an information supplying method or a program executed in an information supplying apparatus, comprises the steps of: detecting an emotional state of a passenger or, in particular, a driver by predetermined detecting means, and supplying the passenger and/or the driver with a predetermined piece of information while changing a transmission method according to a detection result detected at the step of the detecting of the emotional state.

As described above, the present invention judges the driving of a driver on the basis of a detection result of an emotional state of the driver, and thereby the invention can judge the driving more objectively than prior art, and can obtain a suitable judgment result.

Moreover, the present invention supplies a passenger, in particular, a driver with a predetermined piece of information while changing a transmission method according to an emotional state of the passenger and/or the driver, and thereby the invention can transmit various pieces of information to the passenger and/or the driver suitably.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

Hereinafter, the attached drawings are suitably referred while the preferred embodiments of the present invention are described.

(1) First Embodiment (1-1) Configuration of First Embodiment

Figure 1:
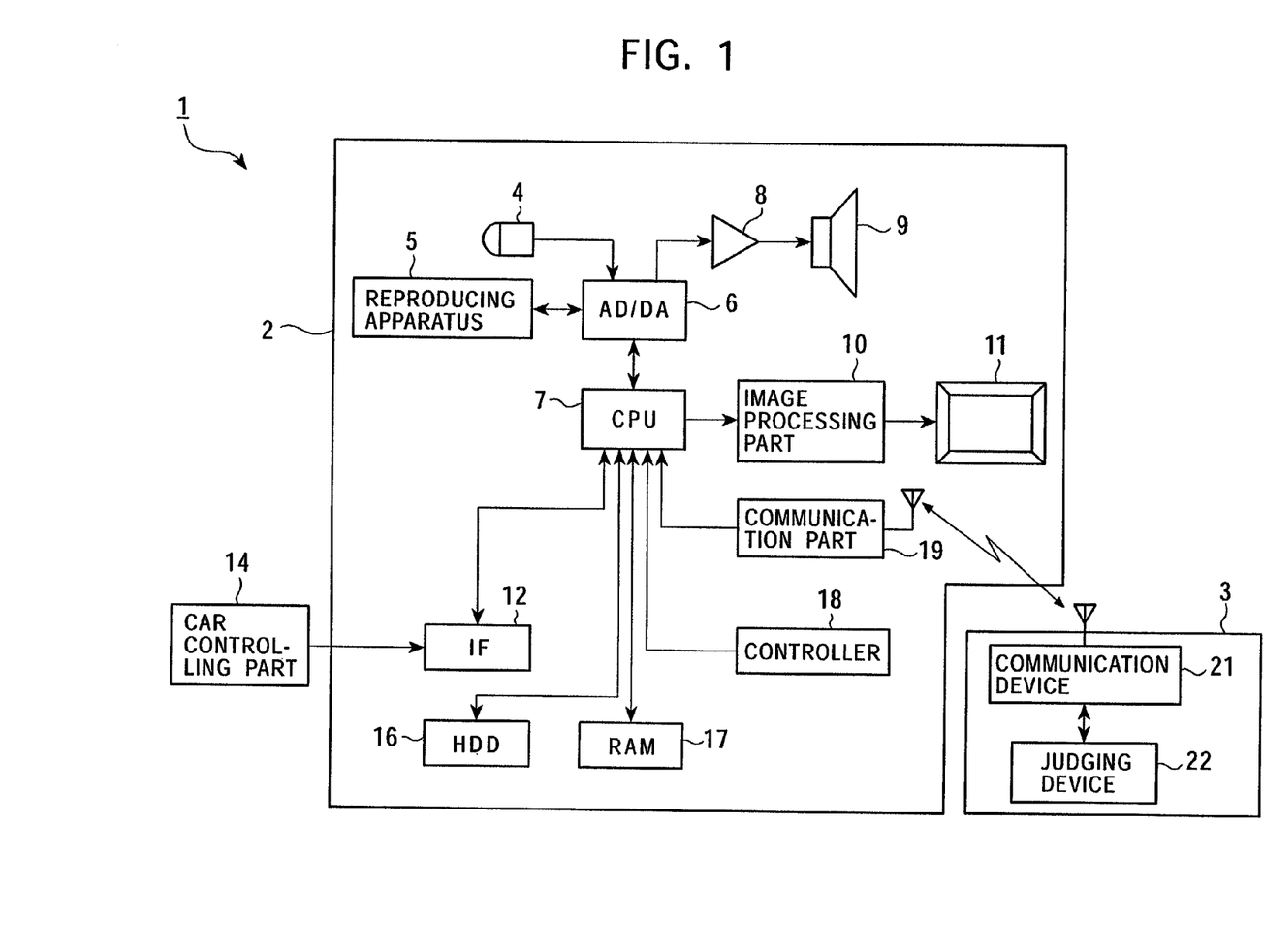
FIG. 1 is a block diagram showing a driving judgment system according to a first embodiment of the present invention.

FIG. 1 is a block diagram showing a driving judgment system according to a first embodiment of the present invention. The driving judgment system 1 grasps an emotional state of a driver driving a vehicle with an on-vehicle state detecting section 2, and the system 1 informs a service center 3 of the detection result. In the embodiment, a car, such as a motorcar is referred to as the vehicle. However, the present invention is not limited to the case of a car. The service center 3 judges the driving of the driver to inform a user of the system 1 of the judgment result. The user may be the driver himself/herself or may be the other passenger in the car. Of course, the user may be a third party.

That is, in the state detecting section 2, a microphone 4 picks a voice in the interior of the car to output a voice signal. A reproducing apparatus 5 is a device for reproducing a medium such as a digital versatile disc (DVD), a compact disc, a compact disc read-only memory (CD-ROM) or the like. The apparatus 5 reproduces a loaded optical disc to output the reproduction results thereof.

An analog-to-digital/digital-to-analog (AD/DA) converter circuit 6 executes a digital-to-analog conversion processing of audio data outputted from the reproducing apparatus 5, voice data outputted from a central processing unit (CPU) 7 and the like, and the AD/DA converter circuit 6 outputs the converted data to an amplifier 8. The amplifier 8 drives a speaker 9 on the basis of the output signal from the AD/DA converter circuit 6. Thereby, the state detecting section 2 is made to be capable of supplying audio signals reproduced by the reproducing apparatus 5 for being listened, and is made to be capable of supplying various pieces of information to be outputted from the CPU 7 for being confirmed by means of voices.

Moreover, the AD/DA converter circuit 6 executes an analog-to-digital conversion processing of voice signals outputted from the microphone 4 to produce voice data, and the AD/DA converter circuit 6 outputs the voice data to the CPU 7. Thereby, the state detecting section 2 is made to be capable of detecting user's various instructions by means of voices. Incidentally, when the optical disc to be reproduced by the reproducing apparatus 5 is a CD-ROM, the AD/DA converter circuit 6 outputs the data outputted from the reproducing apparatus 5 to the CPU 7 as they are. Thereby, the state detecting section 2 is made to be able to upgrade various programs to be executed by the CPU 7, various data necessary for the processing of the program, and the like.

An image processing part 10 executes various pieces of image processing under the control of the CPU 7 to output video signals. A display 11 displays images based on the video signals outputted from the image processing part 10. Thereby, the state detecting section 2 is made to be able to display various menu screens, images of DVD's reproduced by the reproducing apparatus 5, and the like on the display 11.

An interface (IF) 12 operates under the control of the CPU 7. The IF 12 obtains various data necessary for the detection processing of the state of a driver from a car controlling part 14 to output the data to the CPU 7. Hereupon, the car controlling part 14 is a controlling circuit composed of a microcomputer for observing and controlling the operation of each part of the car. Moreover, the data to be obtained in such a way by the IF 12 are composed of data concerning the handling of the car, data concerning the behavior of the car, data concerning a passenger, in particular, a driver, data concerning the environment surrounding the car, and the like. The data concerning the driver is referred to as the data concerning the passenger in the present embodiment.

The data concerning the handling of the car are data of traveling speeds, mileage, the handling of a steering wheel, the openings of an accelerator, the handling of a brake pedal, the handling of a gear lever, the handling of a seat belt, and the like, all being informed from the car controlling part 14. Moreover, the data concerning the behavior of the car are data concerning the changes of the postures of the car that are informed by a not shown navigation section. Moreover, the data concerning the driver are data concerning the physique, the posture, the body temperature, the pulse, the blood pressure, and the like of the driver, that are informed by the car controlling part 14. Various sensors disposed on a seat and the like detect the data concerning the driver. The data concerning the environment surrounding the car are the data of traffic information obtained from not shown radio equipment, the data concerning the situation of a road on which the car is traveling now, the data being detected by the navigation section. The state detecting section 2 judges the emotional state of the driver on the basis of those data.

A hard disc drive (HDD) 16 records and holds programs for the CPU 7, various data necessary for the execution of the programs, and the like. The HDD 16 outputs the data held therein by the accessing of the CPU 7. A random access memory (RAM) 17 constitutes a work area of the CPU 7 and holds various data as the occasion demands. A controller 18 informs the CPU 7 of various operations by the user.

A communication part 19 is communication means for transmitting and receiving various data through, for example, a cellular phone network. The communication part 19 is connected with the service center 3 under the control of the CPU 7 to input or output various data to be transmitted or received between the CPU 7 and the service center 3.

When the user selects the item of the judgment of driving in a menu screen, the CPU 7 executes a predetermined processing program stored in the HDD 16 to inform the service center 3 of the operation of the user through the communication part 19. And then, the CPU 7 analyzes various data inputted through the IF 12 by an instruction from the service center 3 to detect the state of the driver on the basis of the result of the analysis. Moreover, the CPU 7 informs the service center 3 of the thus detected state of the driver in a predetermined format under the control of the communication part 19. And the CPU 7 obtains a judgment result of driving, which was made by the service center 3 and becomes obtainable by the information of the state of the driver, through the communication part 19. The CPU 7 informs the user of the thus obtained judgment result by a voice or a display on the display 11.

In a series of the processes that are executed in such a way, the CPU 7 records various data inputted through the IF 12 in the HDD 16 to make the HDD 16 hold them, and the CPU 7 refers the thus held data while judging the emotion of the driver by processing data inputted through the IF 12.

For example, the CPU 7 judges on the basis of the data concerning the handling of the car that the driver is in haste and is impatient in the following cases: the period of time from the opening of a door to the starting of the movement of the car is judged to be shorter than usual; the timing of the driver's wearing the seat belt is judged to be earlier than usual; the frequency of gear changes is judged to be greater than usual; the frequency of using the brake pedal is judged to be greater than usual; the speed of the car is judged to be faster than usual; the opening of the accelerator is judged to be larger than usual, and the like.

Moreover, the CPU 7 judges on the basis of the data concerning the behavior of the car that the driver is in haste and is impatient in the case where the acceleration and the reduction of the speed of the car can be judged to be more rapid than usual. Moreover, the frequency of the changes of traffic lanes can be judged on the basis of the data concerning the behavior of the car, the data concerning the situation of a road on which the car is traveling now, and the data concerning the handling of the steering wheel. Then, on the basis of the judgment result, in the case where the frequency of the changes of traffic lanes is judged to be greater than usual, the CPU 7 also judges that the driver is in haste and is impatient in this case.

On the other hand, the rise of the emotion, the impatience and the like of the driver can be detected directly from the data concerning the driver such as the blood pressure by the comparison with the usual driver's blood pressure and the like. Moreover, in a case where the number of operations of the brake pedal at the time of traffic jam can be judged to be larger than usual, it can be judged that the driver is impatient and irritable.

Opposingly, when the operations of the accelerator and the like are smooth, it can be judged that the driver is driving in a relaxed state and the driver's emotion is in a calm state.

The CPU 7 detects a driver's emotional state by processing various data statistically with reference to such past records stored in the HDD 16. In the processing, the CPU 7 digitizes the states of the driver with respect to various items indicating not only such impatience but also emotions such as anger and the like, and thereby the CPU 7 generates state detection results of the driver on the basis of the digitized driver's states. Incidentally, hereupon, the emotional state means at least any one of an impatient state, an angered state, a calm state and the like.

When the CPU 7 finds a change produced in any one datum by observing the data obtained through the IF 12, the CPU 7 detects the state of the driver in conformity with the aforesaid processing at every finding. Moreover, the CPU 7 informs the service center 3 of the state of the driver detected in such a way with related data as a package. Thereby, for example, when the driver performed a series of operations composed of stepping on the brake pedal hard, making a flash with headlights, beeping a horn, and stepping on the accelerator, the CPU 7 informs the service center 3 of the state detection results together with the series of operations.

Moreover, when a judgment result of the driving based on the informed date is informed to the CPU 7 from the service center 3, the CPU 7 displays the result on the display 11. At the same time, the CPU 7 completes the detection of the states.

In the service center 3, a communication device 21 exchanges various data with the communication part 19. A judging device 22 is composed of a computer. The judging device 21 judges driving of a driver by processing various data informed from the state detecting section 2, and further the judging device 22 informs the state detecting section 2 of its judgment results through the communication device 21. That is, when an operation pointing the item in a menu indicating the judgment of driving is informed to the judging device 22 from the state detecting section 2, the judging device 22 returns a reply to the state detecting section 2 that sent the information. After the response, the judging device 22 obtains the data of emotional detection results to be inputted from the state detecting section 2 successively. In this case, the judging device 22 digitizes the magnitude of a change of the driver on the basis of the emotional detection results informed from the state detecting section 2 to add the digitized magnitude in sequence. Thereby, the judging device 22 processes the emotional detection results in such a way that a large added value can be obtained when the emotion of the driver frequently rises and the degrees of the rises are large.

The judging device 22 calculates the added value for a predetermined period of time, and the judging device 22 judges the skill of the driving of the driver on the basis of the magnitude of the added value. At this time, the judging device 22 judges the added value with referring to related data informed from the state detecting section 2 together with the emotional detection results. That is, generally, when the emotion of the driver frequently rises during the driving on a superhighway on which driving tends to be comparatively monotonous in comparison with the driving on an open road, it is considerable that the driving or furthermore the car itself has some problem. Moreover, it is considerable that, when the emotion of the driver greatly rises in the driving on such a superhighway, the driver escaped some dangerous situation or the driver performs other similar operations. Consequently, the judging device 22 is made to judge the skill of driving by setting various judgment standards according to the environment surrounding the car also.

For performing such operation, the judging device 22 is made to calculate the aforesaid added value for a period of time sufficient for performing such a judgment. When the judging device 22 judged the driving on the basis of the added value, the judging device 22 informs the state detecting section 2 of the judgment result. At that time, the judging device 22 informs the state detecting section 2 of the result by adding a rank of the skill of the driving.

(1-2) Operation of First Embodiment

In the configuration described above, the state detecting section 2 shown in FIG. 1 detects an instruction of a user by means of a voice of the user by analyzing a user's voice picked by the microphone 4. According to the instruction, for example, an optical disc loaded in the reproducing apparatus 5 is reproduced, and the reproduced sounds and images are supplied to the user through the speaker 9 and the display 11. In the processing, when the user instructed a judgment of driving, the instruction is informed to the service center 3 through the communication part 19 in the state detecting section 2.

Moreover, in the state detecting section 2, the CPU 7 executes the processing of obtaining data concerning the handling of a car, data concerning the behavior of the car, data concerning a driver, data concerning an environment surrounding the car, and the like. And the CPU 7 detects an emotional state of the driver by the statistical comparison processing of the obtained data with the past records of the data.

When the emotion of the driver is judged to be greatly changed on the basis of the thus detected driver's state, the state detecting section 2 informs the service center 3 of the change together with related data obtained through the IF 12. When the judgment of the driving is informed from the state detecting section 2 to the service center 3, the service center 3 digitizes the emotional changes informed in such a way to add up the digitized values. Thereby, the driving judgment system 1 processes the emotional detection results detected by the state detecting section 2 in such a way that large added values can be obtained to a driver who gets frequently angry during driving, a driver who gets violently angry, a driver who gets frequently unsettled during driving, a driver who gets furiously unsettled, and the like.

That is, it is considered that the skill of driving not to cause an accident finally is the best skill. The drivers who frequently raise their emotions during driving or frequently get restless can be said to be threatened by the danger of an accident. Such drivers can be judged to be poor at driving.

On the other hand, drivers who anticipate danger and previously execute an operation such as reducing the speed of the car drive with sufficient composure and scarcely raise their emotion and get restless. Such drivers can be judged to be good at driving. Consequently, the added values obtained in the present embodiment can be the objective digitization of the skill of driving based on a judgment standard more suitable than that of prior art.

When an added value was calculated for a predetermined period of time in such a way, the service center 3 judges the added value to judge the skill of driving. At this time, the service center 3 sets a judgment standard according to the environment surrounding the car to judge the skill of driving of the driver. The judgment result is then informed to the state detecting section 2, and then to the user.

(1-3) Advantages of First Embodiment

According to the aforesaid configuration, the present embodiment judges the driving skill of a driver on the basis of a detection result of a emotional state of the driver, and therefore the embodiment can more objectively judge the driving and can obtain a more suitable judgment result than prior art.

Moreover, because the embodiment informs the driver of the judgment result, the driver can utilize the judgment result for getting himself/herself skillful at the driver's driving, or the like.

In particular, because the embodiment digitizes the magnitude of the emotional changes of a driver and adds the digitized values at every change of the emotions to judge the added value for the judgment of driving, the driving being threatened by the danger of an accident and the similar driving obtain a high added result, but the driving anticipating danger with composure obtains a less added result. Consequently, the skill of driving can be judged suitably and objectively.

Moreover, because such an emotion is detected by the on-vehicle state detecting section 2 and the service center 3 judges driving on the basis of the information from the on-vehicle state detecting section 2, the driving can be judged with a simply configured on-vehicle state detecting section 2.

(2) Modified Example of First Embodiment

Figure 2:
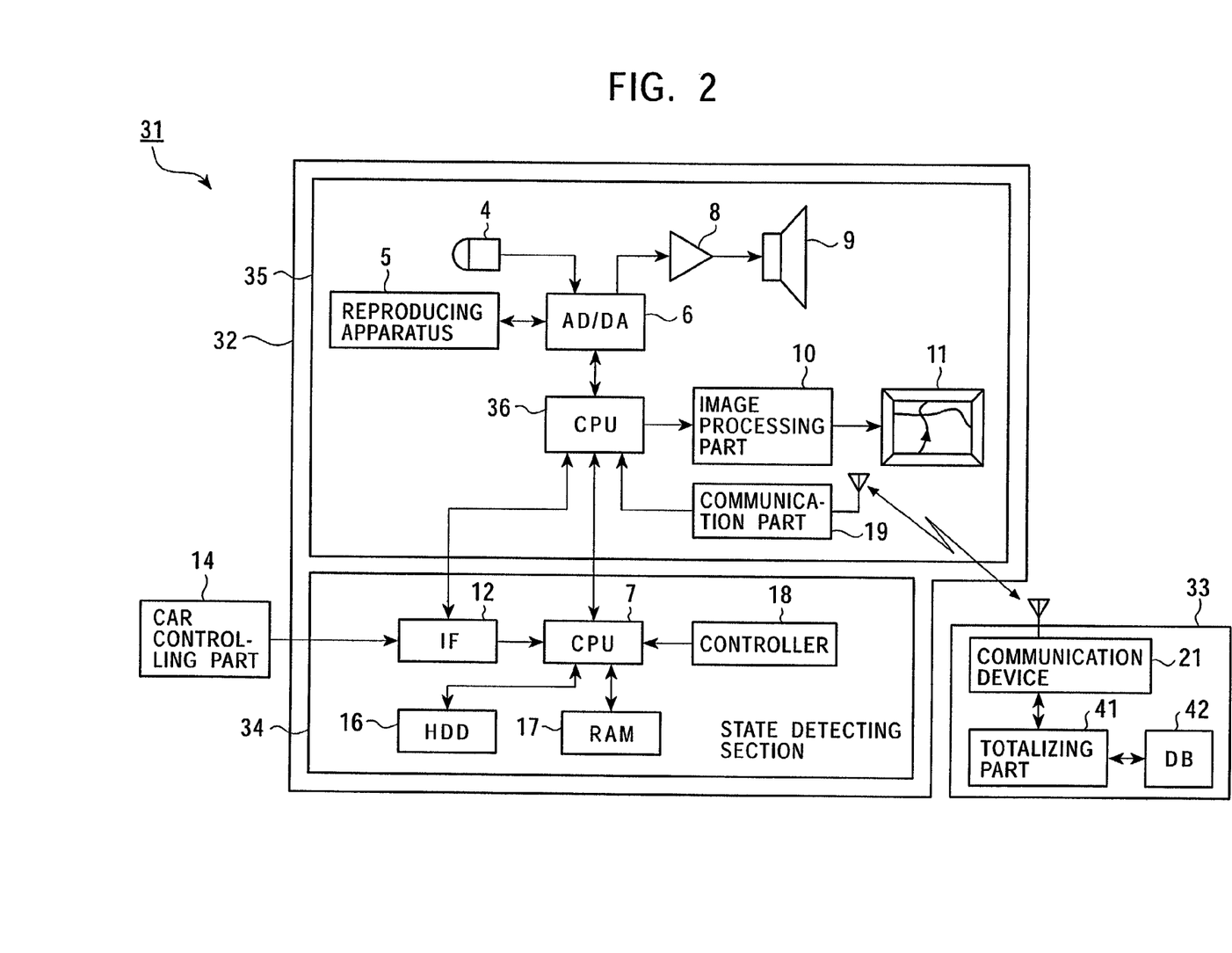
FIG. 2 is a block diagram showing a premium calculating system being a modified example of the first embodiment of the present invention.

FIG. 2 is a block diagram showing a premium calculating system being a modified example of the first embodiment of the present invention. In the modified example, an on-vehicle navigation section 32 shows a driver ways and detects the emotional states of the driver to process the detected results. Moreover, the navigation section 32 informs an adding up center 33 of the processed results. Then the adding up center 33 processes the informed results to set a premium. Incidentally, in the configuration of the modified example, the same components as those of the first embodiment are designated by the corresponding reference numerals and duplicated descriptions are omitted.

In the navigation section 32, a state detecting section 34 detects the emotional states of a driver similarly to the aforesaid state detecting section 2, and informs a navigation part 35 of the emotional detection results together with related information.

The navigation part 35 accepts an instruction of a user by analyzing a voice of the user that is obtained by the microphone 4. In this embodiment, the user may be a passenger in a car or a driver of the car. When the user instructs the navigation part 35, for example, to display a map by the instruction, the navigation part 35 accesses a built-in map database to display a corresponding map on the display 11. Moreover, when the user instructs the navigation part 35 to show the user ways, the navigation part 35 obtains a present position of the car and retrieves a movement route from the present position to a destination to display the movement route on the display 11. Moreover, during the movement through the movement route, the navigation part 35 supplies the user with information such as instructs the user to turn at a corner by a voice output from the speaker 9 and a display on the display 11. Thereby, the navigation part 35 shows the user a way to the destination.

Figure 3:
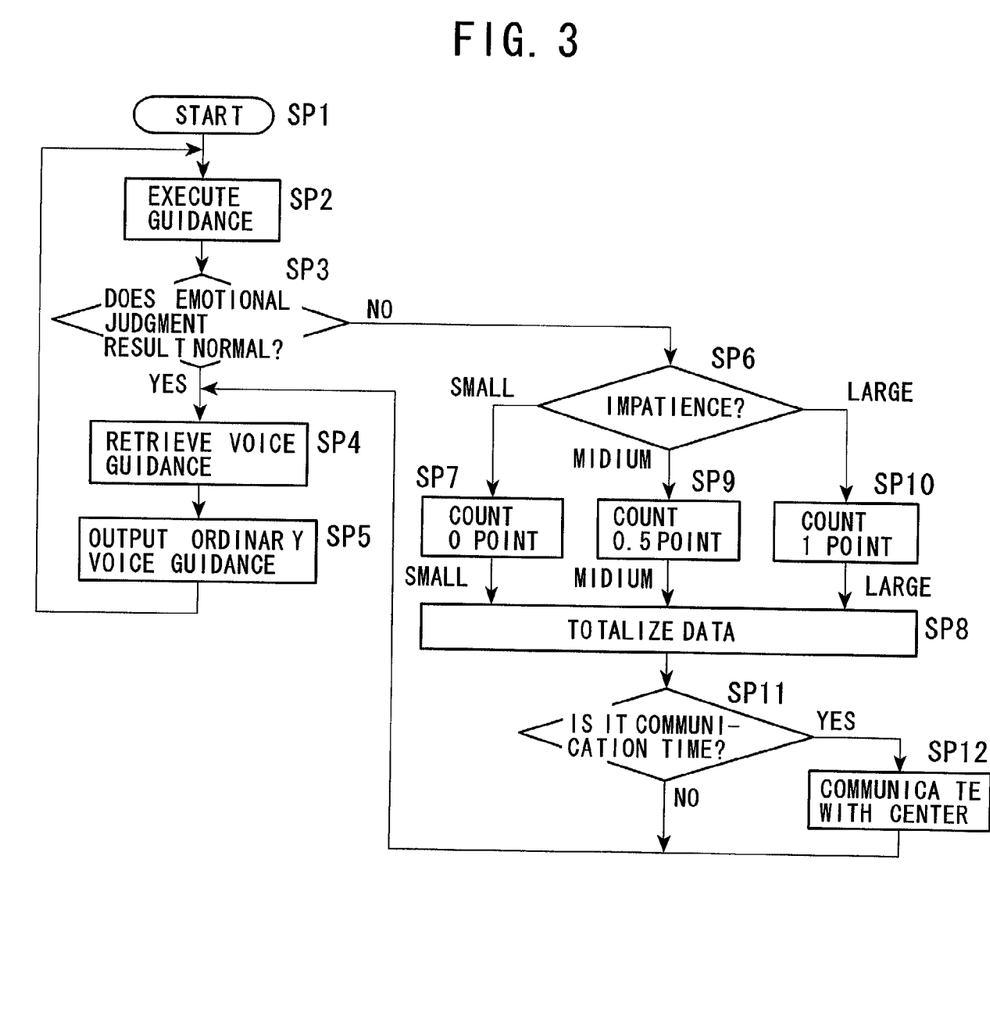
FIG. 3 is a flow chart showing a procedure carried out in a central processing unit of the navigation section in the system shown in FIG. 2.

In the navigation part 35, a CPU 36 is a controller for controlling the operation of the navigation part 35, and the CPU 36 performs the processing such as the guidance of a way by executing the procedure shown in FIG. 3. Moreover, the CPU 36 processes emotional detection results.

That is, when a passenger or a driver, that is, the user instructs the CPU 36 to show the user ways, the CPU moves to Step SP2 from Step SP1 to execute the processing of the guidance of a way in an ordinal navigation section. Incidentally, hereupon, the processing is the processing of detecting a present position to retrieve a movement route, the processing of generating voice data necessary for guiding ways along the movement route, and the like.

After executing the aforesaid processing, the processing by the CPU 36 next moves to Step SP3. At Step SP3, the CPU 36 judges whether the state of the driver that has been informed from the state detecting section 34 is a normal state or not. At this step, when the CPU 36 judges that the driver is driving in a normal state, the CPU 36 moves to Step SP4. At Step SP4, the CPU 36 retrieves whether a guidance by a voice is necessary or not by accessing the map database on the basis of the present position. Moreover, the processing by the CPU 36 moves to Step SP5. At Step Sp5, the CPU 36 informs the user of a message by a voice such as "You turn to left after advancing by 200 meters." After that, the processing by the CPU 36 returns to Step SP2. Consequently, the navigation part 35 is made to guide a user similarly to an ordinary navigation section.

On the other hand, when a negative result is obtained at Step SP3, the processing by the CPU 36 moves to Step SP6. At Step SP6, the CPU 36 judges the degree of the impatience of the driver. When it can be judged that the driver is not so much impatient, the CPU 36 moves to Step SP7. At Step SP7, the CPU 36 sets a point at the value of zero. After that, the processing by the CPU 36 moves to Step SP8. The point is a value to be used for the calculation of an added value to be used for a judgment of driving, and is a digitized value of the magnitude of emotional changes of the driver.

On the other hand, when the degree of the impatience of the driver can be judged to be medium, the processing by the CPU 36 shifts from Step SP6 to Step SP9. At Step SP9, the CPU 36 sets a point at the value of 0.5. After that, the processing by the CPU 36 moves to Step SP8. Moreover, when the degree of the impatience of the driver can be judged to be remarkably violent, the processing by the CPU 36 shifts from Step SP6 to Step SP10. At Step SP10, the CPU 36 sets a point at the value of one. After that, the processing by the CPU 36 moves to Step SP8.

After setting the points in such a way, the CPU 36 adds the points to the added value until that time at Step SP8. Successively, the processing by the CPU 36 moves to Step SP11. At Step SP11, the CPU 36 judges whether the time is the communication time, which is set in the navigation section 32, with the adding up center 33 or not. When the result of the judgment at Step SP11 is negative, the processing by the CPU 36 moves to Step SP4.

On the other hand, when an affirmative result is obtained at Step SP11, the processing by the CPU 36 moves to Step SP12. At Step SP12, the CPU 36 controls the communication part 19 to connect a communication line with the adding up center 33. Moreover, the CPU 36 informs the adding up center 33 of an added value calculated by repeating the processing at Step SP8. Besides, the CPU 36 also informs the adding up center 33 of the data related to the emotional changes judged to be the point of the value of 0.5 or the point of the value of one and a driving history from past notices to the present notice. After informing the adding up center 33 of the aforesaid added value and other data in such a way, the CPU 36 resets the added value at the value of zero, and then the processing by the CPU 36 moves to Step SP4.

Incidentally, the CPU 36 is made to repeat the procedures at Step SP3 to Step SP12 at a fixed period even when the user does not instruct the guidance of ways, and thereby the CPU 36 is made to calculate the added values always by observing the driving of the driver. Moreover, the CPU 36 is made to inform the service center 3 of the added values and the like at predetermined dates and times.

In the adding up center 33, a totalizing part 41 is a computer for processing various data obtained from the communication device 21. The totalizing part 41 judges driving skill on the basis of the various data. The totalizing part 41 accesses a database (DB) 42 on the basis of the result of the judgment to set a premium.

Hereupon, the DB 42 records and holds the data that concern the premium of each user and are managed by a premium calculation system 31. The data concerning the premium are the data for the specification of a user such as a user's address, a user's date of birth, a user's gender, a user's contact address and the like; the data concerning a user's driving experience such as a date and a time when a user obtained his or her driver's license, an accident history, and the like; the data concerning a contract such as a past contract history, premiums in past contracts, a car being an object of the contract, and the like; data used in calculations of the past premiums; and the like.

The totalizing part 41 discriminates added values informed from the navigation section 32 on the basis of predetermined judgment standard values, and thereby the totalizing part 41 evaluates the skill of driving by classifying it into a plurality of ranks. In the processing, the totalizing part 41 evaluates the skill of driving by setting the judgment standard values suitably according to the data stored in the DB 42 such as the area where the driver exists, the age of the driver, the driving experience of the driver; and the data, which is informed from the navigation section 32, of total driving hours of the driver calculated from the driving experience.

Moreover, the totalizing part 41 records the judgment result in the DB 42. The totalizing part 41 totalizes the judgment results of the skill of driving stored in the DB 42 in such a way at predetermined premium calculation times, and thereby the totalizing part 41 totally judges the skill of driving. Moreover, the totalizing part 41 calculates a premium on the basis of the total judgment result.

The thus obtained judgment result of the skill of driving has suitability and objectivity as described with respect to the first embodiment. Therefore, a premium can be fairly set by the calculation of the premium using the judgment result.

Even if the totalizing part 41 for judging the skill of driving is installed in the car in the configuration of the modified example of the first embodiment, driving can be judged more objectively than prior art, and a suitable judgment result can be obtained like the first embodiment.

Accordingly, a premium can fairly be set by the utilization of the judgment result in the calculation of the premium.

(3) Other Embodiments

Incidentally, the aforesaid embodiment digitizes simply the magnitude of emotional changes to execute the addition processing of the digitized values, and the embodiment judges the skill of driving on the basis of the addition results. However, the present invention is not limited to such a case. The invention may add values digitized in such a way after weighting the values according to the environments in which a car is driving. Namely, when a car drives slowly, even if the car causes an accident, the accident would not become a serious accident. Consequently, the amount of money to be compensated by insurance would be small. However, in a case where a car causes an accident when it is driving at a high speed on a superhighway or the like, the probability of the occurrence of a serious accident is high. Consequently, the amount of money to be compensated by insurance would be large with a large probability. Accordingly, when the digitized values are weighted according to the environments to be added under the consideration of the aforesaid situations, the judgment result concerning the skill of driving would be utilized more effectively. Incidentally, instead of such processing, magnitude of emotional changes may be digitized according to the environment in which a car is driving to be added, and thereby the skill of driving may be judged at every environment. Thereby, judgment results as a driver is good at driving in a downtown and poor at driving on a superhighway can be obtained.

Moreover, the aforesaid embodiment simply judges the skill of driving and calculates a premium on the basis of a judgment result. However, the present invention is not limited to such a case. The present invention may be applied to various cases utilizing the judgment results of the skill of driving such as a case where a plurality of drivers compete on their rankings of the skill of driving. Incidentally, in the case of competing the rankings, it is considerable to judge the skill of driving by the judging of added values relative to each other.

Next, a second embodiment is described.

(4) Configuration of Second Embodiment

Figure 5:
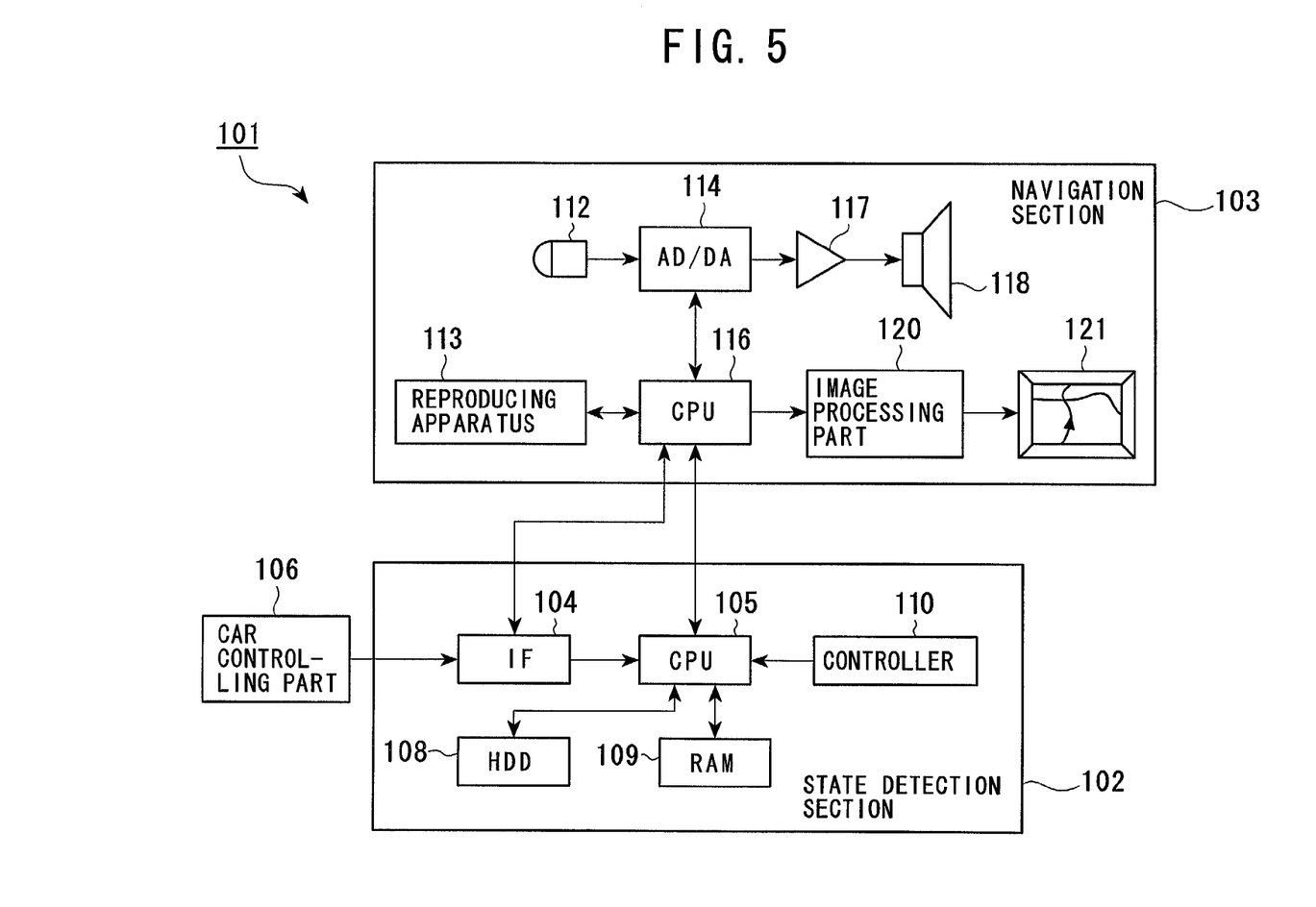
FIG. 5 is a block diagram showing the information processing apparatus according to the second embodiment of the present invention.

FIG. 5 is a block diagram showing an on-vehicle apparatus according to the second embodiment of the present invention. The on-vehicle apparatus 101 is installed in a vehicle such as a motorcar and transmits various pieces of information to a passenger and/or a driver of the motorcar. In this embodiment, a car is referred to as the vehicle.

In the on-vehicle apparatus 101, a state detecting section 102 detects an emotional state of a driver, and the state detecting section 102 informs a navigation section 103 of a detection result. In the state detecting section 102, an interface (IF) 104 operates under the control of a central processing unit (CPU) 105, and the IF 104 obtains various data necessary for the processing of the state detecting section 102 from the navigation section 103 and a car controlling part 106 to output them to the CPU 105. The car controlling part 106 is a control circuit composed of a microcomputer for observing the operation of each section of the car to control it. Moreover, the data obtained through the IF 104 in such a way are composed of data concerning the handling of the car, data concerning the behavior of the car, data concerning a passenger and/or a driver, data concerning the environments surrounding the car, and the like. Data concerning a driver is mainly referred to as the data concerning the passenger and/or the driver in the present embodiment.

The data concerning the handling of the car are data of traveling speeds, mileage, the handling of a steering wheel, the openings of an accelerator, the handling of a brake pedal, the handling of a gear lever, the handling of a seat belt, and the like, all being informed from the car controlling part 106. Moreover, the data concerning the behavior of the car are data concerning the changes of the postures of the car or the like that are detected by the navigation section 103. Moreover, the data concerning the driver are data concerning the physique, the posture, the body temperature, the pulse, the blood pressure, and the like of the driver that are informed by the car controlling part 106. Various sensors disposed on a seat and the like detect the data concerning the driver. The data concerning the environment surrounding the car are the data of traffic information obtained from not shown radio equipment, the data concerning the situation of a road on which the car is traveling now, the data being detected by the navigation section 103. The state detecting section 102 is made to judge the emotional state of the driver on the basis of those data and to inform the navigation section 103 of the judgment results.

A hard disk drive (HDD) 108 records and holds programs for the CPU 105, various data necessary for the execution of the programs, and the like. The HDD 108 outputs the held data by the accessing of the CPU 105. A random access memory (RAM) 109 constitutes a work area of the CPU 105 and temporarily holds various data as the occasion demands. A controller 110 outputs various operations by the user to the CPU 105.

The CPU 105 analyses various data inputted through the IF 104 by executing a predetermined processing program stored in the HDD 108 to detect a state of the driver on the basis of the results of the analysis. Moreover, the CPU 105 informs the navigation section 103 of the state of the driver detected in such a way through a not shown IF.

In the process for detecting the state of the driver in such a way, the CPU 105 records various data inputted through the IF 104 in the HDD 108 to make the HDD 108 hold them, and the CPU 105 refers the thus held data while judging the emotion of the driver by processing the data inputted through the IF 104.

For example, the CPU 105 judges on the basis of the data concerning the handling of the car that the driver is in haste and is impatient in the following cases: the period of time from the opening of a door to the starting of the movement of the car is judged to be shorter than usual; the timing of the driver's wearing a seat belt is judged to be earlier than usual; the frequency of gear changes is judged to be greater than usual; the frequency of using the brake pedal is judged to be greater than usual; the speed of the car is judged to be faster than usual; the opening of the accelerator is judged to be larger than usual, and the like.

Moreover, the CPU 105 judges on the basis of the data concerning the behavior of the car that the driver is similarly in haste and is impatient in the case where the acceleration and the reduction of the speed of the car can be judged to be more rapid than usual. Moreover, the frequency of the changes of traffic lanes can be judged on the basis of the data concerning the behavior of the car, the data concerning the situation of a road on which the car is traveling now, and the data concerning the handling of the steering wheel. Then, on the basis of the judgment result, in the case where the frequency of the changes of traffic lanes is judged to be greater than usual, the CPU 105 judges that the driver is in haste and is impatient in this case also.

On the other hand, the rise of the emotion, the impatience and the like of the driver can be detected directly from the data concerning a driver such as the blood pressure by the comparison with the usual driver's blood pressure and the like. Moreover, in a case where the number of operations of the brake pedal at the time of traffic jam can be judged to be larger than usual, it can be judged that the driver is impatient and irritable.

Opposingly, when the operations of the accelerator and the like are smooth, it can be judged that the driver is driving in a relaxed state and the driver's emotion is in a calm state.

The CPU 105 detects emotional states of a driver in conformity with such an algorithm by processing various data statistically, and the CPU 105 informs the navigation section 103 of detection results. In the processing, the CPU 105 digitizes and outputs the states of the driver as to various items indicating not only such impatience but also anger and the like.

The navigation section 103 retrieves a movement route to a destination to guide a user on the basis of an instruction from the user. Moreover, the navigation section 103 outputs the data concerning the behavior of the car, the data concerning the road situation on which the car is driving now, and the like among the various data to be utilized in such guidance to the state detecting section 102.

That is, in the navigation section 103, a microphone 112 picks voice signals in the interior of the car to output them. A reproducing apparatus 113 is a device for reproducing a medium such as a DVD, a compact disc, a CD-ROM or the like. The reproducing apparatus 113 reproduces a loaded optical disc to output the reproduction results thereof.

An AD/DA converter circuit 114 executes a digital-to-analog conversion processing of audio data outputted from the reproducing apparatus 113, voice data outputted from a CPU 116 and the like, and the AD/DA converter circuit 114 outputs the converted data to an amplifier 117. The amplifier 117 drives a speaker 118 on the basis of the output signal from the AD/DA converter circuit 114. Thereby, the navigation section 103 is made to be capable of outputting audio signals reproduced by the reproducing apparatus 113 to be listened, and is made to be capable of making various pieces of information to be outputted form the CPU 116 be confirmed by means of voices.

Moreover, the AD/DA converter circuit 114 executes an analog-to-digital conversion processing of voice signals outputted from the microphone 112 to generate voice data, and the AD/DA converter circuit 114 outputs the voice data to the CPU 116. Thereby, the navigation section 103 is made to be capable of detecting user's various instructions using voices. Incidentally, when the optical disc to be reproduced by the reproducing apparatus 113 is a CD-ROM, the AD/DA converter circuit 114 outputs the data outputted from the reproducing apparatus 113 to the CPU 116 as they are. Thereby, the navigation section 103 is made to be able to upgrade various programs to be executed by the CPU 116, various data necessary for the processing of the program, and the like.

An image processing part 120 executes various pieces of image processing under the control of the CPU 116 to output video signals. A display 121 displays images based on the video signals outputted from the image processing part 120. Thereby, the navigation section 103 is made to be able to display various menu screens, maps to be used for the guidance of ways, images of DVD's reproduced by the reproducing apparatus 113, and the like on the display 121.

The CPU 116 is controlling means for controlling the operation of the navigation section 103, and the CPU 116 supplies various pieces of information to a user by executing prescribed procedures recorded in a not shown recording means.

Figure 6:
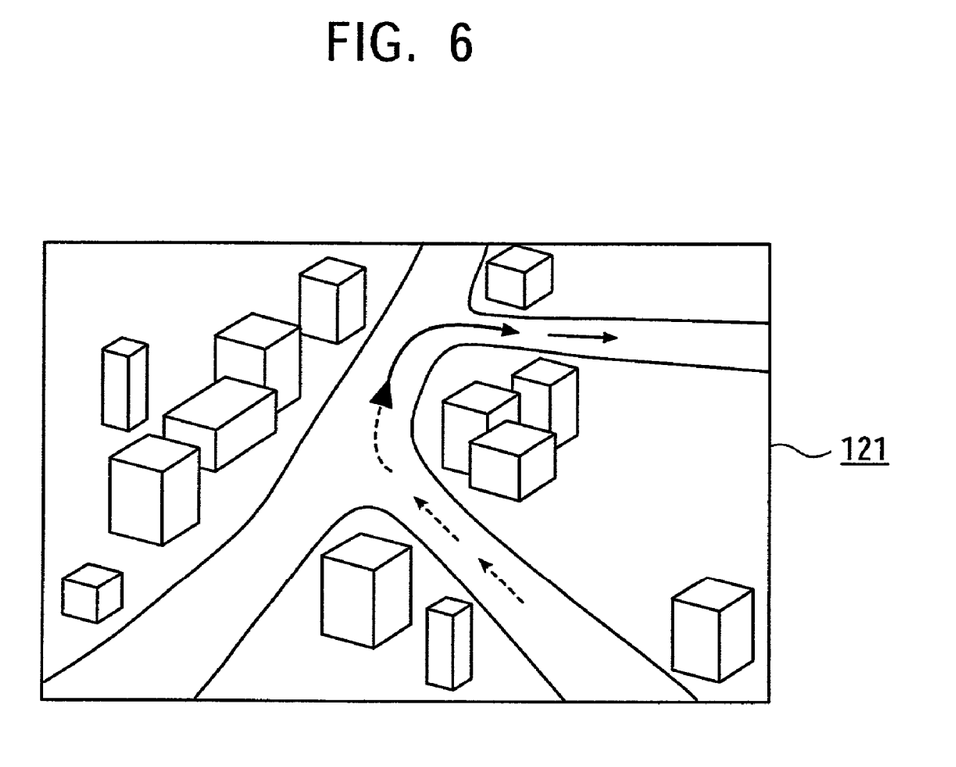
FIG. 6 is a plan view showing a screen displaying an image with the information processing apparatus shown in FIG. 5.

That is, the CPU 116 detects an instruction by means of a voice of the user by performing the signal processing of the voice obtained by the microphone 112 to analyze the processed voice. The CPU 116 switches its operation by the instruction. When the user instructs the CPU 116 to display a map by means of a voice, the CPU 116 accesses a built-in map database to display a corresponding map on the display 121. Moreover, when the user instructs the CPU 116 to guide a way to a destination, the CPU 116 performs the signal processing of a signal that has been transmitted from a global positioning system (GPS) satellite and received by a not shown antenna, and thereby the CPU 116 detects the present position of the car by utilizing the GPS system. Moreover, the CPU 116 corrects the present position detected in such a way by the use of detection results by means of an angular velocity sensor, a gyroscope and the like. Moreover, the CPU 116 retrieves a movement route to the destination on the basis of the thus detected present position information and the information of the destination that is inputted by a user. Then, the CPU 116 displays the movement route on the display 121 together with a map. Moreover, when the car approaches to, for example, an intersection in the movement along the movement route, the CPU 116 informs the user of a message by a voice such as "You turn to left after advancing by 200 meters." Thereby, the CPU 116 guides the driver along the movement route retrieved in such a way. Incidentally, as shown in FIG. 6, the CPU 116 is made to display the movement route and the map 121 in the so-called bird's-eye view.

Incidentally, the CPU 116 is made to output the information such as the present position, the moving direction and the like, which are utilized in such processing, as the data concerning the behavior of the car, and the data of the number of traffic lanes, which can be obtained by accessing the map database on the basis of the present position, as the data concerning the road situation on which the car is driving now to the state detection section 102.

Figure 4:
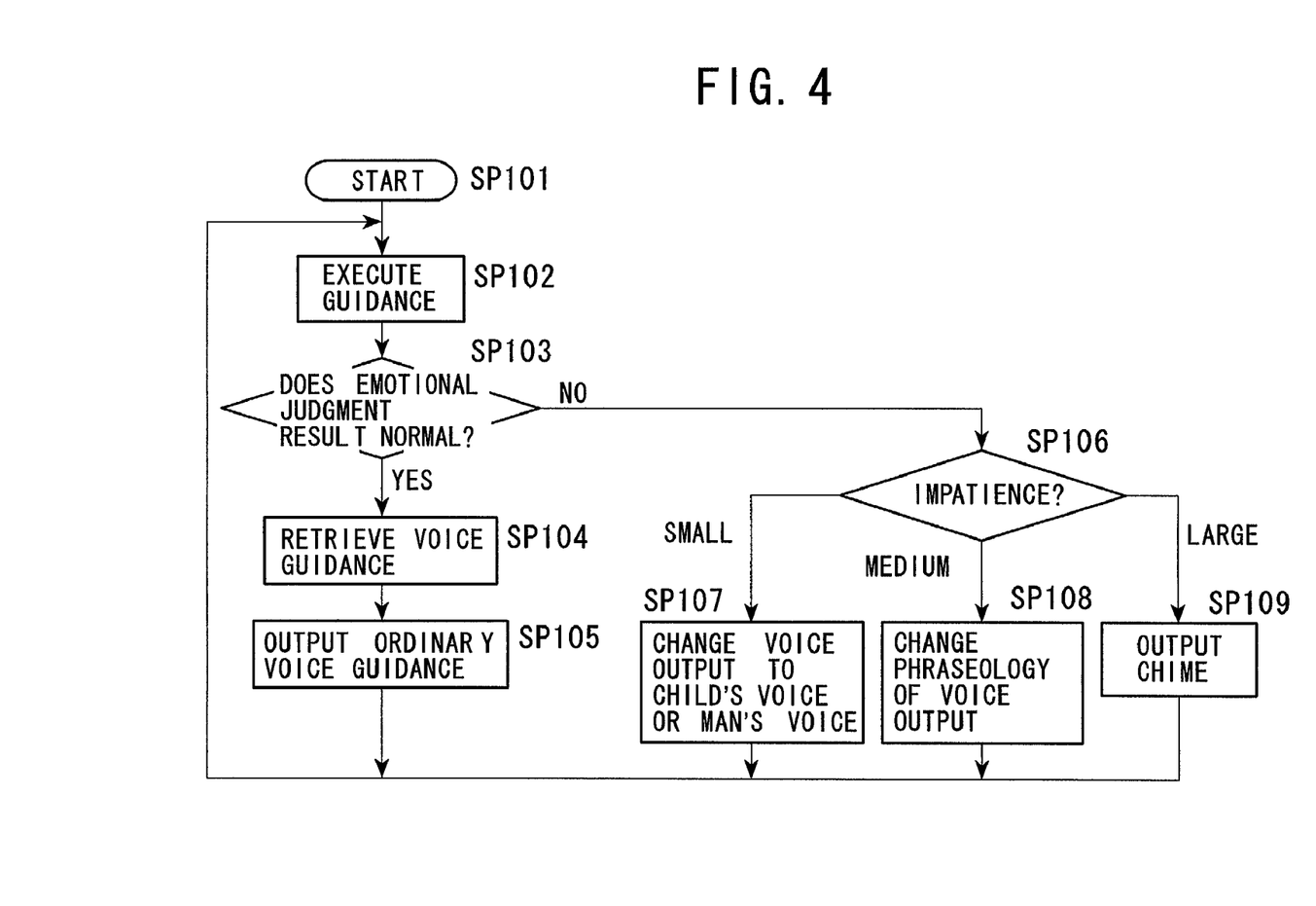
FIG. 4 is a flow chart showing a procedure carried out in a central processing unit of an information processing apparatus according to a second embodiment of the present invention.

During the processing of such a guidance of a way, the CPU 116 variously switches the transmission methods of information according to the states of the user detected by the state detecting section 102 by executing the procedure shown in FIG. 4.

That is, when a passenger and/or a driver, that is, a user instructs the CPU 116 to show the passenger ways, the processing by the CPU 116 moves to Step SP102 from Step SP101 to execute the processing of the guidance of a way in an ordinary navigation section. Incidentally, hereupon, the processing is the processing of detecting a present position to retrieve a movement route, the processing of generating voice data necessary for guiding ways along the movement route, and the like.

After executing the aforesaid processing, the processing by the CPU 116 next moves to Step SP103. At Step SP103, the CPU 116 judges whether the state of the driver that has been informed from the state detecting section 102 is a normal state or not. At this step, when the driver is driving in a relaxed state, the CPU 116 judges that the driver is driving in a normal state. Then, the processing by the CPU 116 moves to Step SP104. At Step SP104, the CPU 116 retrieves whether a guidance by a voice is necessary or not by accessing the map database on the basis of the present position. Moreover, the processing by the CPU 116 moves to Step SP105. At Step SP105, the CPU 116 informs the user of a message by a voice such as "You turn to left after advancing by 200 meters.", for example, when the car approaches to an intersection as described above. After that, the processing by the CPU 116 returns to Step SP102. Consequently, the navigation section 103 is made to guide a user similarly to an ordinary navigation section when the user, in this case, the driver is in a normal state.

On the other hand, when a negative result is obtained at Step SP103, the processing by the CPU 116 moves to Step SP106. At Step SP106, the CPU 116 judges the degree of the impatience of the driver. When it can be judged that the driver is not so much impatient, the processing by the CPU 116 moves to Step SP107. At Step SP107, the CPU 116 switches the kind of a voice used as the guidance of a way to a men's voice or a child's voice. Incidentally, in a case of a normal state, the guidance is made by means of an adult woman's voice. Thereby, the CPU 116 switches the kind of the voice of the guidance of a way according to the state of the driver. After that, the processing by the CPU 116 returns to Step SP102.

On the other hand, when the degree of the impatience of the driver can be judged to be moderate, the processing by the CPU 116 shifts from Step SP106 to Step SP108. At Step SP108, the CPU 116 switches the phraseology of the voice using the guidance of a way. Incidentally, in a case of a normal state, the guidance is made in a polite phraseology as described above. But, after the switching of the phraseology, the guidance of a way is made by a phraseology of saying only essential points such as, for example, "Left. 200 meters ahead." Thereby, the processing by the CPU 116 is made to return to Step SP102 after switching the phraseology of a voice telling the guidance of a way when the change of the state of the driver is more violent.

When the impatience of the driver can be judged to be extremely violent, the processing by the CPU 116 shifts from Step SP106 to Step SP109. At Step SP109, the CPU 116 stops the guidance of a way by a voice, and guides an intersection or the like by a chime, one of warning sounds. Incidentally, the guidance by the chime is made to shorten the intervals of intermittent chimes to change a continuous sound as the car approaches to the intersection as a landmark for informing the destination.

(5) Operation of Second Embodiment

In the configuration described above, the on-vehicle apparatus 101 shown in FIG. 5 detects an instruction of a user by means of a voice of the user by analyzing the user's voice picked by the microphone 112. According to the instruction, for example, when the user instructs the display of a map, the on-vehicle apparatus 101 accesses a built-in map database to display a corresponding map on the display 121. Moreover, when the user instructs the guidance of a way to a destination, the on-vehicle apparatus 101 obtains the present position of the car, and retrieves a movement route from the present position to the destination to display the retrieved movement route on the display 121. Moreover, during the movement along the movement route, the on-vehicle apparatus 101 supplies the user with the information to instruct the user about a corner and the like by means of the voice from the speaker 118 and the display on the display 121. Thereby, the user can move to the destination by driving the car in conformity with the information supplied in such a way.

At the time of such driving, in the on-vehicle apparatus 101, the CPU 105 in the state detecting section 102 obtains the data concerning the handling of the car, the data concerning the behavior of the car, the data concerning a passenger and/or a driver, the data concerning the environment surrounding the car, and the like. The data concerning the driver is mainly referred to as the data concerning the passenger and/or the driver in the present embodiment. And the CPU 105 detects the emotional state of the driver by the statistical comparison processing of the obtained data with the past records of the data.

When the emotion of the driver is judged to be in an ordinary state on the basis of the thus detected driver's state, the on-vehicle apparatus 101 informs the driver on the corner or the like with an adult woman's voice as an information transmission method. Opposingly, when the driver is impatient, the information transmission method is changed to the transmission of the information of the corner or the like by means of an adult man's voice or a child' voice in place of the adult woman's voice. Thereby, the on-vehicle apparatus 101 can make the driver recover his or her composure to inform the driver of the guidance of the corner or the like surely by means of the voice.

When the impatience of the driver can be judged to be more violent, the on-vehicle apparatus 101 changes the phraseology of the guidance by means of the changed adult man's voice or the child's voice, and furthermore supplies the driver with guidance by means of a warning sound in place of the voice. That is, in a case where the guidance using a polite phraseology when the impatience of the driver is violent, the polite guidance is frequently regarded as a nuisance. In such a case, by transmitting only the essential points, the information of the guidance can surely be transmitted. Moreover, when the impatience becomes extreme, the guidance by means of a voice itself is regarded as a nuisance. In such a case, it is considerable that the guidance by means of a warning sound would surely be able to be transmitted. Accordingly, the present embodiment is made to switch information transmission methods according to the impatience of a driver, which is a judgment standard when the driver's state is grasped from his or her emotional aspect. Thereby, the present embodiment is made to transmit various pieces of information to a passenger and/or the driver suitably.

(6) Advantages of Second Embodiment

According to the aforesaid configuration, the present embodiment switches the information transmission methods by means of voices according to the impatience of a driver and/or a passenger, which is a judgment standard when the state of the driver and/or the passenger is grasped from his or her emotional aspect, and thereby the embodiment can suitably transmit various pieces of information to the driver and/or the passenger.

(7) Other Embodiment

Incidentally, as for the aforesaid second embodiment, the case of changing a voice quality, the case of changing a phraseology, the case of changing a voice to a warning sound are described as the switching of the transmission methods of information. However, the present invention is not limited to such cases. The invention may change the volume of a voice, or may use various sounds other than the voices, and further may change the guidance of a way to the guidance using only display on a screen, in addition to or in place of the changes of the aforesaid voice qualities, phraseologies and chimes. Moreover, in a case of guiding a way as an image on the display 121, the transmission method of the information of the guidance may be changed. The changeable methods of the guidance by means of images on the display 121 may include a method of changing the color of a landmark indicating a corner, a method of switching the display of the landmark to a blinking display, and the like.

Moreover, the second embodiment concerns the case where the information of guiding a way is supplied to a driver, one of passengers. The preset invention is not limited such a case. The invention may widely be applicable in a case where such information is supplied to all of the driver and the passengers. Incidentally, in this case, for example, it is considerable that such information is separately supplied to each of the driver and the passengers with each speaker installed in each seat. In such a case, it is considerable to change information transmission methods separately to each of the driver and the passengers according to the state of each of them.

Moreover, the second embodiment changes the methods of the transmission of information on the basis of the impatience, one of emotions of a user, that is, a driver and/or a passenger. However, the present invention is not limited to such a case. For example, anger, exaltation and the like may be used as a basis of the changing of the information transmission methods. Incidentally, when the emotion of a driver is exalted, the driving can be more pleasant by changing the phraseology of the information to one that makes the driver and the passenger feel enjoyable.

Moreover, in the second embodiment, the case where the guidance information of a corner or the like is supplied in the navigation section 103 is described. However, the present invention is not limited to such a case. The present invention can widely be applied to the information of various pieces of warning. Moreover, the present invention could widely be applied to, for example, the case where the information such as pieces of music reproduced by the reproducing apparatus 113 and the like is supplied. Incidentally, in the case of supplying the information such as music, for example, there may be a case where the music that has been supplied to each passenger through each speaker installed in each seat is changed to be supplied to all of the passengers commonly through a speaker installed in a door.

Although the invention has been described in its preferred form with a certain degree of particularity, obviously many changes and variations are possible therein. It is therefore to be understood that the present invention may be practiced than as specifically described herein without departing from scope and the sprit thereof.

What is claimed is:

1. An information processing apparatus, comprising:
   information acquiring means installed in a vehicle for acquiring a state detection result of an emotion of a driver of a vehicle;
   judging means for judging a degree of impatience of the driver based on the state detection result of the emotion of the driver;
   navigation means for providing the driver with road directions using voice messages, wherein the voice messages are changed in response to the judged degree of impatience of the driver; and
   communication means for transmitting the state detection result to a service center located outside the vehicle, the service center including:
   judging means for judging a driving skill of the driver of the vehicle based on the state detection result acquired by the information acquiring means, and
   contact premium calculation means for calculating a contact premium based on the judged driving skill of the driver.

2. The information processing apparatus according to claim 1, further comprising informing means for informing the driver of the vehicle of a judgment result by the judging means.

3. The information processing apparatus according to claim 1, wherein:
   the judging means obtains an added value indicating a change of the emotion of the driver by digitizing a magnitude of the change of the emotion of the driver to add the digitized magnitude at each change of the emotion; and
   the judging means generates a judgment result of the driving by judging the added value.

4. An information processing method, comprising the steps of:
   acquiring in a vehicle a state detection result of an emotion of a driver of the vehicle; and
   judging a degree of impatience of the driver based on the state detection result of the emotion of the driver;
   providing the driver with road directions using voice messages, wherein the voice messages are changed in response to the judged degree of impatience of the driver;
   transmitting the state detection result to a service center located outside the vehicle, the service center performing the steps of:
   judging a driving skill of the driver of the vehicle based on the state detection result acquired at the acquiring step; and
   calculating a contact premium based on the judged driving skill of the driver.

5. The method according to claim 4, further comprising the step of informing the driver of the vehicle of a judgment result at the judging step.

6. A program executed in an information processing apparatus, the program comprising the steps of:
   acquiring in a vehicle a state detection result of an emotion of a driver of the vehicle; and
   judging a degree of impatience of the driver based on the state detection result of the emotion of the driver;
   providing the driver with road directions using voice messages, wherein the voice messages are changed in response to the judged degree of impatience of the driver;
   transmitting the state detection result to a service center located outside the vehicle, the service center performing the steps of:
   judging a driving skill of the driver of the vehicle based on the state detection result acquired at the acquiring step, and
   calculating a contact premium based on the judged driving skill of the driver.

7. The program executed in a information processing apparatus according to claim 6, further comprising the step of informing the driver of the vehicle of a judgment result at the judging step.

* * * * *